April 1, 1924.
C. E. JOHANSSON ET AL
1,488,818
INDICATING DEVICE FOR MEASURING INSTRUMENTS
Filed Sept. 16, 1920  2 Sheets-Sheet 1
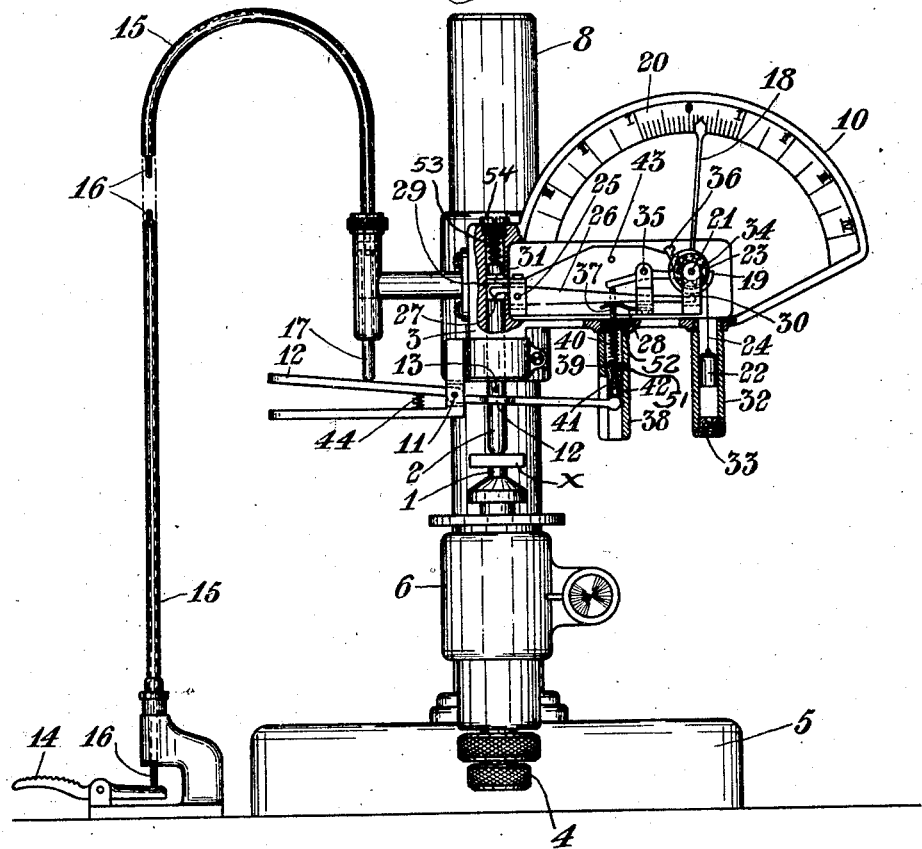
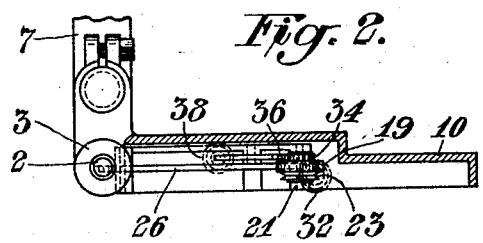
Inventors:
CARL EDVARD JOHANSSON
LUDWIG OSCAR ÖIJERHOLM
By George Bayard Jones Atty

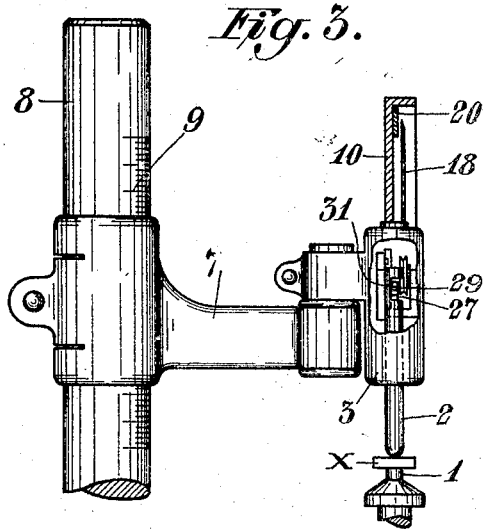
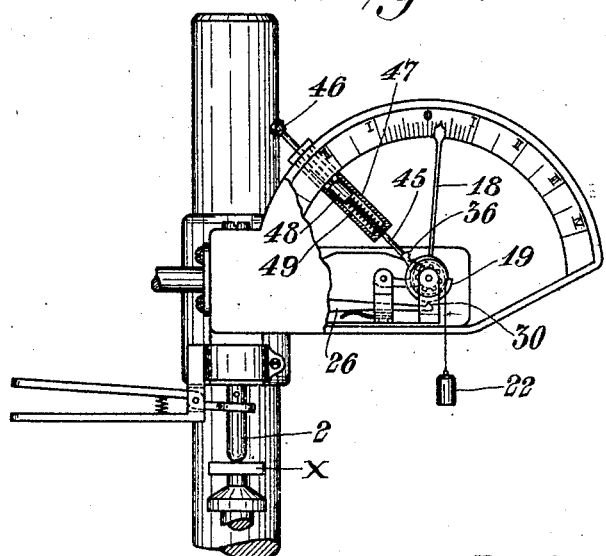

Patented Apr. 1, 1924.

1,488,818

UNITED STATES PATENT OFFICE.

CARL EDVARD JOHANSSON AND LUDWIG OSCAR ÖIJERHOLM, OF ESKILSTUNA, SWEDEN, ASSIGNORS, BY DIRECT AND MESNE ASSIGNMENTS, TO AKTIEBOLAGET C. E. JOHANSSON, OF ESKILSTUNA, SWEDEN, A COMPANY OF SWEDEN.

INDICATING DEVICE FOR MEASURING INSTRUMENTS.

Application filed September 16, 1920. Serial No. 410,752.

*To all whom it may concern:*

Be it known that we, CARL EDVARD JOHANSSON and LUDWIG OSCAR ÖIJERHOLM, subjects of the King of Sweden, and residents of Eskilstuna, in the Kingdom of Sweden, have invented a new and useful Improvement in Indicating Devices for Measuring Instruments, of which the following is a specification.

The present invention relates to an indicating device for measuring apparatus and measuring instruments of the type which serve to measure deviations in one direction or the other from a fixed measure, and which are provided with two measuring studs or the like which are movable relatively to one another, and with which the body to be measured is brought into contact. The indicating device consists of a rotatable pointer which is released when the distance between the measuring studs is changed, and which through cooperation with an arc eccentrical relatively to the pivot of the pointer, for instance a spiral arc, is caused to adjust itself in a position corresponding to the new distance between the measuring studs determined by the body. An indicating device constructed according to this principle is described in the U. S. Patent No. 1,334,955, Mar. 30, 1920. According to the said patent the pointer is actuated by a spring which tends to turn the pointer from its initial position, and which turns the pointer when it is released owing to a body being placed between the measuring studs, until the pointer again comes into contact with the eccentric arc. The pointer will obtain a highly accelerated movement, however, particularly if the body is rapidly introduced between the measuring studs, with the result that there may be a certain insecurity of the measuring results, since, even if the pointer is made as light as possible, it will always have a certain inertia on account of which the pointer has a tendency of moving somewhat too far, if it has obtained a great speed when it hits the eccentric arc. This is of course particularly apt to happen in instruments for making exceedingly accurate measurements in which the eccentricity of the arc is small so that the pointer hits the arc at a very small angle.

The purpose of the indicating device forming the subject of the present invention is to avoid the said inconvenience. For this purpose the invention is principally characterized by this that the pointer is connected with a gas or liquid brake which serves to regulate the movement of the released pointer, so that said movement will always take place with the most constant speed possible, independently of how far the pointer has to move in each particular instance. Owing to this very accurate and reliable measuring results are obtained with this device, so that the instrument will be sure to indicate also very small deviations, such as 0.001 millimeter. Furthermore, it has proved to be very difficult in practice to give the spring actuating the pointer in the old device above referred to, a perfectly constant pulling power, and it is therefore desirable to make the pointer actuated by a weight, supported for instance in a cord wound around a small pulley secured to the spindle of rotation of the pointer, said weight being movable in a vertical cylinder so as simultaneously to serve as a piston of the brake connected with the pointer. In this manner the torque actuating the pointer will always remain constant which fact will of course aid to increase the reliability of the measuring results. This arrangement of a weight actuating the pointer can only be used to advantage in measuring instruments which are placed on a stationary support, and not in instruments which are held by the hand during the measuring, but this circumstance is of less importance, inasmuch as instruments for so accurate measurements as those in question should in any case be securely supported.

In the accompanying drawings two embodiments of the invention are illustrated by way of example. Fig. 1 shows a side view partly in section of a measuring instrument intended for external measurements and provided with an indicating device according to the present invention. Fig. 2 shows the indicating device viewed from above. Fig. 3 shows a side view of a portion of the instrument. Fig. 4 shows a slightly simplified construction of the instrument.

The measuring instrument illustrated in Figs. 1, 2 and 3 is intended to be placed upon a table or other fixed support, and consists principally of a lower stationary measuring stud 1, and an upper movable measuring stud 2 which is guided in a sleeve 3. The two measuring studs are in alignment and their end surfaces directed towards one another constitute the measuring surfaces between which the piece of work or body to be measured is introduced. The lower measuring stud is adjustable, for the purpose further defined hereinbelow, by means of a micrometer screw 4 and is supported in a bearing 6 secured to the base plate 5 of the instrument. The sleeve 3 in which the measuring stud 2 is movable, is supported by an arm 7 which is adjustable in vertical direction on a vertical column 8 secured to the base plate 5 and suitably provided with a scale or graduations 9. The casing 10 surrounding the indicating device is rigidly secured to the sleeve 3.

In order to facilitate the introduction of the piece of work between the two measuring surfaces the upper measuring stud 2 which is actuated by a spring 53 inserted between the upper end of said stud 2 and a cap 54 screwed into the sleeve 3 above the stud 2, is capable of being raised slightly by means of the lever 12 turning on the pivot 11 and adapted to engage a pin 13 in said measuring stud. The lever 12 may be turned either by hand, or as shown in Fig. 1, by means of a treadle 14 which by the intermediary of a metal wire 16 sliding in the tube 15 which is suitably flexible in order to enable the treadle 14 to be easily placed in a convenient location in relation to the measuring instrument proper, actuates a plunger 17 so that said plunger depresses the free arm of the lever 12. In this manner the advantage is attained that the operator has both hands free for handling the piece of work.

The indicating device which indicates the position of the movable measuring stud 2, comprises a pointer 18 secured to a rotatable disk 19 and movable over a dial 20 on which a certain mean position of the pointer is marked by the numeral 0. The disk 19 is secured upon a spindle 21 rotatably journalled in the casing 10, or in a member rigidly secured to said casing. The disk, the circumference of which is shaped to an Archimedean spiral, is given a tendency to turn in clockwise direction in Fig. 1 by a weight 22 suspended on a cord wound around a pulley 23 secured to the spindle 21 of the disk. The necessary connecting link between the movable measuring stud 2 and the pointer 18 consists of a two-armed lever 26 turning on the pivot 25 and having at the end of its short arm an edge 27 which is maintained by a spring 28 actuating the long arm of the lever, in contact with the lower face of a lateral recess 29 in the measuring stud 2. The long arm of the lever also ends in an edge 30 which bears against the circumference of the disk 19 when the indicating device has come to rest.

The lowermost position of the measuring stud 2 is determined by an arm 31 projecting into the lateral recess 29 above the lever 26. It may be assumed that the measuring stud 2 occupies said lowermost position and that the pointer 18 occupies its corresponding initial position farthest to the left on the dial 20 in Fig. 1, to which position it must be returned after every measuring operation before beginning the next measuring operation. The pointer is retained in said initial position by the edge 30 pressing under the influence of the spring 28 against the spiral-shaped circumference of the disk 19, thereby preventing the weight 22 from turning the pointer. If the measuring stud 2 is slightly raised, however, for instance by a piece of work X being introduced between said stud and the measuring stud 1, the lever 26 will be turned clockwise in Fig. 1, with the result that the edge 30 is removed a short distance from the circumference of the disk 19. The disk 19 and thus also the pointer 18 become free, and the weight 22 begins to turn the pointer to the right in Fig. 1. This movement continues until owing to the spiral shape of the circumference of the disk 19, said disk again comes into contact with the edge 30. As long as the edge 27 bears against the bottom of the recess 29 in the measuring stud 2 the relation between the movement of the point of the pointer and the movement of the measuring stud is constant and dependent upon the relation between the lengths of the two arms of the lever 26 and of the pitch of the spiral and the length of the pointer, so that by altering one or more of these factors the movement of the pointer between two graduation marks on the dial may be made to correspond to a movement of 0.1, 0.01, 0.001 mm. and so forth, of the measuring stud 2.

In order to prevent the pointer 18 when released in the manner above described, from obtaining an accelerated movement to the right in Fig. 1, the weight 22 actuating the pointer is placed in a vertical cylinder 32 the upper open end of which is secured to the casing 10. The lower end of the cylinder is closed by means of a cap provided with a fine outlet opening for the air which opening may be regulated by means of a throttle screw 33. When the pointer is released the weight can therefore not sink more rapidly than in proportion as the air in the cylinder below the weight escapes through the said opening. The weight thus forms simultaneously the piston of a dash pot with which the movement of the pointer is regulated so that said movement always takes place with a constant and comparatively small speed. By this construction the pointer stops instantly when the circumference of the disk 19 again comes into contact with the edge 30, and the pointer can not pass this point under the influence of its inertia.

The present measuring instrument being intended, as mentioned above, for measuring deviations from a certain dimension, the instrument is made ready for such measuring by first introducing between the measuring studs 1 and 2 a gauge block of the certain dimension required for the occasion. Afterwards the measuring surface of the stud 1 is adjusted by means of the micrometer screw 4 in such manner that the pointer stops on zero in the middle of the scale 20. When the gauge block is afterwards removed from the measuring opening or space, the measuring stud 2 again drops down until it gains support on the arm 31, whereas the pointer 18 still maintains its position with its point on zero of the scale, owing to the edge 30 remaining pressed against the circumference of the disk 19.

In order that the pointer may be conveniently returned to its initial position farthest to the left on the scale, there is secured to the spindle of the spiral disk 19 a small toothed pinion 34 with which a toothed segment 36 rotatable on the pivot 35 meshes. Said segment is actuated by a rod 37 movable in a sleeve 38 secured to the casing 10 and provided approximately in the middle with an offset 51, the upper portion of the sleeve being slightly wider than the lower portion. The rod 37 is guided in a cap 52 screwed into the upper portion of the sleeve, and supports at its lower end a piston 39 against which a coil spring 40 bears, said spring tending to push the rod downwards so that its piston is maintained bearing against the abovementioned offset in the sleeve. A second coil spring 41 and a movable piston 42 are provided in the lower narrower portion of the sleeve 38, the lever 12 projecting into the sleeve 38 through a longitudinal slot and bearing with its end against the lower surface of said piston 42. By means of the lever 12 it is thus possible to push the rod 37 upwards and turn the toothed segment 36 until it stops against the stop 43, when the pointer 18 has also been turned back to the initial position at the left-hand end of the scale 20, Fig. 1. The upper spring 40 is slightly longer and weaker than the lower spring 41. When the lever is turned counter-clockwise in Fig. 1, only the spring 40 is therefore compressed at first, until the toothed segment 36 is stopped against the stop 43. Simultaneously the lever 12 comes into engagement with the pin 13 on the measuring stud 2. On the continued turning of the lever in the same direction as before, for the purpose of raising the measuring stud 2 for introducing the piece of work X between the measuring surfaces, also the spring 41 becomes compressed. The lever 12 with which the measuring stud 2 is raised, thus serves also to return the pointer 18 to the initial position which may thus be effected by pressing down the treadle 14.

On the continued turning of the lever 12 after it has made contact with the pin 13, the lever 26 will of course also be turned, so that the edge 30 releases the spiral disk 19. The weight 22 can not yet put said disk or the pointer into motion, however, owing to the toothed segment 36 being maintained against the stop 43 by the lever 12 by the intermediary of the spring 41 and the rod 37. When the piece of work has been introduced into the measuring space and the treadle 14 is released, the lever 12 is returned to the position of rest shown in Fig. 1 by the springs 41 and 44, so that the measuring stud 2 can drop down onto the piece of work. The rod 37 is simultaneously moved downwards again by the spring 40, so that the toothed segment 36 is released, and no longer prevents the weight 22 from turning the spiral disk and the pointer. This latter will therefore be turned to the right with a certain speed braked in the manner above described, until the circumference of the disk 19 again comes into contact with the edge 30, when the pointer stops at the graduation mark of the scale which indicates how much the dimension of the piece of work deviates from that of the gauge block previously introduced. If the pointer stops on the left hand side of the zero mark the dimension of the piece of work is obviously too small—provided that the spiral forming the circumference of the disk 19 has the direction shown in Fig. 1—whereas said dimension is too large if the pointer passes the zero mark.

It will be understood from the above description that the lever 12 with which the measuring stud 2 is raised for the introduction of the piece of work into the measuring space, simultaneously serves to lock the indicating device so that it can not function until the measuring stud 2 has again been allowed to drop down onto the piece of work, and thus the edge 30 occupies the position which corresponds to the dimension of said piece of work. It will also be understood that the arrangement of the weight 22 must always be such that it tends to turn the spiral disk 19 in such direction that the circumference of said disk is moved towards the edge 30 when the latter has been moved away from the circumference of the disk.

The adjustment of the measuring stud 1 by the aid of the micrometer screw 4 can only take place within comparatively narrow limits, for reasons easily understood. If pieces of work of considerably larger dimensions are to be measured, the arm 7 and thus the entire indicating device and the measuring stud 2 are moved upwards on the column 8, when a rough adjustment may be made by the aid of the graduation 9. The accurate adjustment is afterwards made in the manner above described by the aid of a guage block and the micrometer screw 4.

The embodiment illustrated in Fig. 4 differs from the one above described only in respect of the means for returning the pointer 18 to the initial position farthest to the left on the scale 20. As in the first embodiment a pinion is secured to the spindle of the spiral disk 19 and a toothed segment 36 meshes with said pinion. In this case, however, said segment is actuated by a rod 45 movable in the direction of the toothed rim of the segment approximately tangentially to the same, said rod being provided at its outer end with a button 46 which must be pressed for returning the pointer. This simplified returning device, in the use of which it must be observed that the pointer is retained by pressure applied to the rod 45 in the initial position, until the upper measuring stud 2 has been allowed to drop down onto the piece of work X introduced into the measuring space, is simultaneously formed as a brake for regulating the movement of the pointer, in the embodiment illustrated. For this purpose the rod 45 passes through holes in the two bottoms of a cylinder 47 filled with glycerine or other liquid, and within said cylinder there is secured to the rod a piston 48 which, however, does not bear tightly against the cylinder wall. The surface of the piston directed towards the toothed segment is actuated by a coil spring 49. When pressure is applied to the button 46 the spring 49 becomes compressed, the toothed segment 36 is turned, and the pointer 18 is returned to initial position. When the button is released the spring 49 moves the piston back according as the liquid in the cylinder can flow past the piston between the cylinder wall and the piston. The weight 22 may thus turn the pointer 18 to the right in the manner above described, until the circumference of the spiral disk 19 touches the edge 30 on the lever 26. In this embodiment the weight 22 need thus not be enclosed in a cylinder.

We claim:

1. In an indicating device for measuring apparatus and measuring instruments, the combination of two coacting measuring members, a rotatable pointer connected with one of said members, means for turning said pointer, means connected with the other of said members and adapted to cooperate with said pointer so as to stop its movement in a position corresponding to the distance between said measuring members, and a brake for regulating the movement of said pointer when turned by said means.

2. In an indicating device for measuring apparatus and measuring instruments, the combination of two coacting measuring members, a rotatable pointer connected with one of said members, a pulley secured to and turning with said pointer, a cord wound around said pulley, a weight supported by said cord, means connected with the other of said members and adapted to cooperate with said pointer so as to stop its movement in a position corresponding to the distance between said measuring members, and a brake for regulating the movement of said pointer when turned by said weight.

3. In an indicating device for measuring apparatus and measuring instruments, the combination of two coacting measuring members, a rotatable pointer connected with one of said members, a pulley secured to and turning with said pointer, a cord wound around said pulley, a weight supported by said cord, a cylinder in which said weight is movable and means connected with the other of said members and adapted to cooperate with said pointer so as to stop its movement in a position corresponding to the distance between said measuring members.

CARL EDVARD JOHANSSON.
LUDWIG OSCAR ÖIJERHOLM.